(12) United States Patent
Iwabuchi

(10) Patent No.: US 8,781,251 B2
(45) Date of Patent: Jul. 15, 2014

(54) IMAGE PROCESSING DEVICE AND IMAGE PROCESSING METHOD DEFORMATION PROCESSING BASED ON A RULE

(75) Inventor: Shigaku Iwabuchi, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/824,155

(22) PCT Filed: May 31, 2011

(86) PCT No.: PCT/JP2011/062486
§ 371 (c)(1),
(2), (4) Date: Mar. 15, 2013

(87) PCT Pub. No.: WO2012/164686
PCT Pub. Date: Dec. 6, 2012

(65) Prior Publication Data
US 2013/0177245 A1   Jul. 11, 2013

(51) Int. Cl.
*G06K 9/40* (2006.01)

(52) U.S. Cl.
USPC ........... 382/275; 382/183; 382/181; 382/254; 382/282; 235/462.01; 235/462.02; 235/462.06; 235/462.07; 235/462.08

(58) Field of Classification Search
None
See application file for complete search history.

(56) References Cited

U.S. PATENT DOCUMENTS

| | | | |
|---|---|---|---|
| 7,143,948 B2 * | 12/2006 | Nakazawa et al. | 235/462.1 |
| 7,337,970 B2 * | 3/2008 | Joseph et al. | 235/462.1 |
| 2002/0003896 A1 * | 1/2002 | Yamazaki | 382/135 |
| 2005/0150957 A1 * | 7/2005 | Lubow | 235/462.01 |
| 2005/0213790 A1 * | 9/2005 | Rhoads et al. | 382/100 |
| 2009/0001165 A1 * | 1/2009 | Zhang et al. | 235/462.11 |
| 2009/0059316 A1 * | 3/2009 | Irwin et al. | 358/474 |
| 2010/0239118 A1 * | 9/2010 | Behm et al. | 382/100 |
| 2011/0290878 A1 * | 12/2011 | Sun et al. | 235/437 |
| 2011/0290879 A1 * | 12/2011 | Guo et al. | 235/437 |
| 2011/0290880 A1 * | 12/2011 | Cai et al. | 235/437 |
| 2012/0087551 A1 * | 4/2012 | Bhagwan et al. | 382/118 |
| 2013/0022231 A1 * | 1/2013 | Nepomniachtchi et al. | 382/102 |

FOREIGN PATENT DOCUMENTS

| | | | |
|---|---|---|---|
| JP | 7-121673 A | 5/1995 | |
| JP | 2000-511320 A | 8/2000 | |
| JP | 2006-018655 A | 1/2006 | |
| JP | 2007-520001 A | 7/2007 | |
| JP | 2009-129269 A | 6/2009 | |
| WO | 98/48373 A1 | 10/1998 | |

OTHER PUBLICATIONS

English translation of the International Preliminary Report on Patentability and Written Opinion dated Dec. 12, 2013, in International Application No. PCT/JP2011/062486.*
Orli Sharaby; Form Meets Function: Extreme Makeover QR Code Edition; http://blog.360i.com/mobile-marketing/creative-qr-codes or http://archive.today/zDOV#selection-715.2-717.12; 360i Digital Connections; pp. 1-4; Date: Oct. 18, 2010.

* cited by examiner

*Primary Examiner* — Matthew Bella
*Assistant Examiner* — Jason Heidemann
(74) *Attorney, Agent, or Firm* — Sughrue Mion, PLLC

(57) ABSTRACT

A character recognition accuracy from an image in which a graphic code and at least one character are in a given positional relationship is improved. An image acquisition section (20) acquires the image including the graphic code and the at least one character positioned outside the graphic code, which are in the given positional relationship. A deformation rule identification section (26) identifies a deformation rule for deforming the graphic code, which is included in the image acquired by the image acquisition section (20), to a graphic of a known type. A deformation processing execution section (28) executes, on the at least one character included in the image acquired by the image acquisition section (20), deformation processing based on the deformation rule identified by the deformation rule identification section (26).

20 Claims, 3 Drawing Sheets

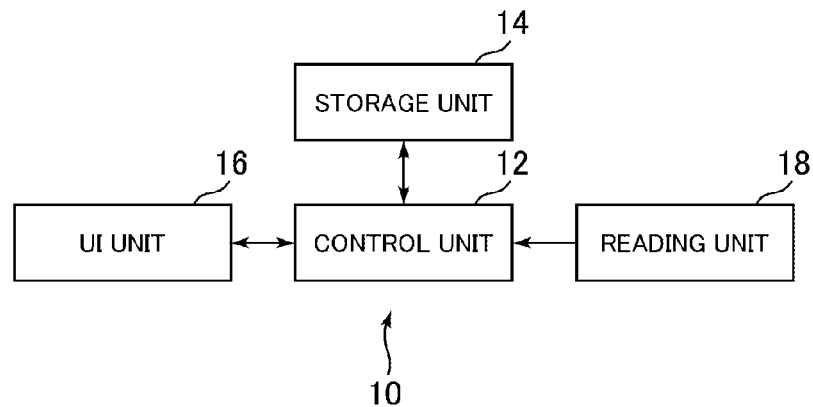
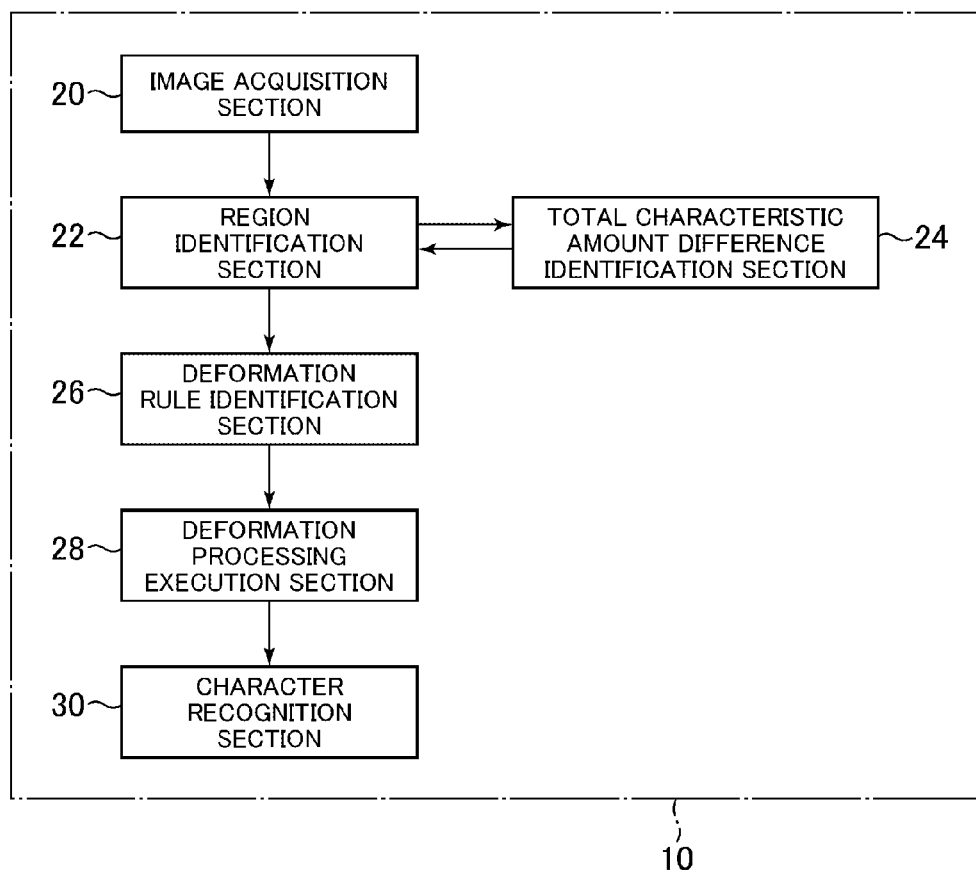

IMAGE PROCESSING DEVICE AND IMAGE PROCESSING METHOD DEFORMATION PROCESSING BASED ON A RULE

CROSS REFERENCE TO RELATED APPLICATIONS

This application is a National Stage of International Application No. PCT/JP2011/062486 filed May 31, 2011, the contents of all of which are incorporated herein by reference in their entirety.

TECHNICAL FIELD

The present invention relates to an image processing device, an image processing method, a program, and a recording medium.

BACKGROUND ART

There has been known a technology of using, even in a situation where a part of information represented by a bar code cannot be decoded by a bar code reader, a character recognition technology to recognize characters adjacent to the bar code, to thereby supplement the decoding of the information represented by the bar code. For example, Patent Literature 1 discloses a bar code decoding system for supplementing the conventional bar code reading technology by using optical character recognition processing to read human readable characters that correspond to an unsuccessfully decoded code word in a bar code symbol.

CITATION LIST

Patent Literature

[Patent Literature 1] JP 2000-511320 A

SUMMARY OF INVENTION

Technical Problem

In the technology as described in Patent Literature 1, for example, in addition to cases where the result of reading the bar code is blurred or the bar code to be read is soiled, in a case where an image obtained as the result of reading the bar code is deformed with respect to the original bar code, the information represented by the bar code cannot be read successfully.

The present invention has been made in view of the above-mentioned problem, and therefore has an object to improve a character recognition accuracy from an image in which a graphic code and at least one character are in a given positional relationship.

Solution to Problem

In order to solve the above-mentioned problem, according to the present invention, there is provided an image processing device, including: image acquisition means for acquiring an image including a graphic code and at least one character positioned outside the graphic code, which are in a given positional relationship; deformation rule identification means for identifying a deformation rule for deforming the graphic code, which is included in the image acquired by the image acquisition means, to a graphic of a known type; and deformation processing execution means for executing, on the at least one character included in the image acquired by the image acquisition means, deformation processing based on the deformation rule identified by the deformation rule identification means.

According to the present invention, there is also provided an image processing method, including: an image acquisition step of acquiring an image including a graphic code and at least one character positioned outside the graphic code, which are in a given positional relationship; a deformation rule identification step of identifying a deformation rule for deforming the graphic code, which is included in the image acquired in the image acquisition step, to a graphic of a known type; and a deformation processing execution step of executing, on the at least one character included in the image acquired in the image acquisition step, deformation processing based on the deformation rule identified in the deformation rule identification step.

According to the present invention, there is also provided a program for causing a computer to function as: image acquisition means for acquiring an image including a graphic code and at least one character positioned outside the graphic code, which are in a given positional relationship; deformation rule identification means for identifying a deformation rule for deforming the graphic code, which is included in the image acquired by the image acquisition means, to a graphic of a known type; and deformation processing execution means for executing, on the at least one character included in the image acquired by the image acquisition means, deformation processing based on the deformation rule identified by the deformation rule identification means.

According to the present invention, there is also provided a recording medium having a program recorded thereon, the program causing a computer to function as: image acquisition means for acquiring an image including a graphic code and at least one character positioned outside the graphic code, which are in a given positional relationship; deformation rule identification means for identifying a deformation rule for deforming the graphic code, which is included in the image acquired by the image acquisition means, to a graphic of a known type; and deformation processing execution means for executing, on the at least one character included in the image acquired by the image acquisition means, deformation processing based on the deformation rule identified by the deformation rule identification means.

According to the present invention, the deformation processing based on the deformation rule for deforming the graphic code to the graphic of the known type is executed on the character included in the image, to thereby improve the character recognition accuracy from the image in which the graphic code and the at least one character are in the given positional relationship.

Further, according to an aspect of the present invention, the image processing device further includes: total characteristic amount difference identification means for identifying, for each of two directions that are substantially orthogonal to each other in a region within the image acquired by the image acquisition means, a total characteristic amount difference of subimages that are adjacent to each other along the each of the two directions in the region; and region identification means for identifying a region within the image acquired by the image acquisition means, and a difference of the total characteristic amount differences identified by the total characteristic amount difference identification means for the two directions satisfies a given condition relating to the difference of the total characteristic amount differences, in which the deformation rule identification means identifies a deformation rule for deforming an outline graphic of the region, which is obtained as a result of the identification by the region identification means, to the graphic of the known type.

Further, according to an aspect of the present invention, the region identification means identifies a region within the image acquired by the image acquisition means, in which the difference of the total characteristic amount differences identified by the total characteristic amount difference identification means for the two directions is maximum.

Further, according to an aspect of the present invention, the total characteristic amount difference identification means identifies, for the each of the two directions that are substantially orthogonal to each other in the region within the image acquired by the image acquisition means, a total luminance difference of pixels that are adjacent to each other along the each of the two directions in the region.

Further, according to an aspect of the present invention, the region identification means executes the identification of the region for a plurality of sets of the two directions, and the deformation rule identification means identifies a deformation rule for deforming an outline graphic of a region, of a plurality of the regions associated with different sets of the two directions obtained as the results of the identification by the region identification means, in which a difference of the total characteristic amount differences identified by the total characteristic amount difference identification means is maximum, to the graphic of the known type.

Further, according to an aspect of the present invention, the image processing device further includes direction identification means for identifying two directions that are substantially orthogonal to each other, in which a difference between frequency characteristic amounts of histograms in the two directions satisfies a given condition relating to the difference between the frequency characteristic amounts for at least a part of the image acquired by the image acquisition means, and the total characteristic amount difference identification means identifies, for each of the two directions identified by the direction identification means, a total characteristic amount difference of subimages that are adjacent to each other along the each of the two directions.

Further, according to an aspect of the present invention, the deformation rule identification means identifies a deformation rule for deforming the graphic code, which is included in the image acquired by the image acquisition means, to a graphic of a known shape.

Further, according to an aspect of the present invention, the image processing device further includes character recognition means for recognizing a character after the execution of the deformation processing by the deformation processing execution means.

BRIEF DESCRIPTION OF DRAWINGS

FIG. 1 A diagram illustrating an example of a hardware configuration of an image processing device according to an embodiment of the present invention.

FIG. 2 A functional block diagram illustrating an example of functions implemented by the image processing device according to the embodiment of the present invention.

DESCRIPTION OF EMBODIMENTS

Figure 3:
FIG. 3 A diagram illustrating an example of a bar code image.

Hereinafter, an embodiment of the present invention is described in detail with reference to the accompanying drawings.

FIG. 1 is a diagram illustrating an example of a hardware configuration of an image processing device 10 according to the embodiment of the present invention. As illustrated in FIG. 1, the image processing device 10 according to this embodiment includes, for example, a control unit 12, which is a program control device such as a central processing unit (CPU) and operates in accordance with a program installed in the image processing device 10, a storage unit 14, which is a memory element such as a read-only memory (ROM) or a random access memory (RAM), a hard disk drive, or the like, a user interface (UI) unit 16, such as a liquid crystal touch panel, a display, and a keypad, for outputting a content of an operation performed by a user to the control unit 12 and outputting information in accordance with an instruction input from the control unit 12, and a reading unit 18, which is an image scanner or a Web camera and reads a bar code.

FIG. 2 is a functional block diagram illustrating an example of functions implemented by the image processing device 10 according to this embodiment. The image processing device 10 according to this embodiment functionally includes an image acquisition section 20, a region identification section 22, a total characteristic amount difference identification section 24, a deformation rule identification section 26, a deformation processing execution section 28, and a character recognition section 30. Those elements are implemented mainly by the control unit 12.

Those elements are implemented by executing, by the control unit of the image processing device 10, which is a computer, the program installed in the image processing device 10. Note that, the program is supplied to the image processing device 10 via, for example, a computer-readable recording medium such as a compact disc read-only memory (CD-ROM) or a digital versatile disc read-only memory (DVD-ROM), or via a communication network such as the Internet.

The image acquisition section 20 acquires a bar code image 40 read by the reading unit 18, which is exemplified by FIG. 3. As illustrated in FIG. 3, in this embodiment, the bar code image 40 includes a graphic code 40a and a character string 40b. In this embodiment, the graphic code 40a and the character string 40b are in a given positional relationship. Also in this embodiment, the read bar code image 40 is warped upward, and left and right end portions thereof are blurred.

The region identification section 22 identifies, from the bar code image 40 acquired by the image acquisition section 20, a region occupied by the graphic code 40a (hereinafter, referred to as graphic code region).

Figure 4:
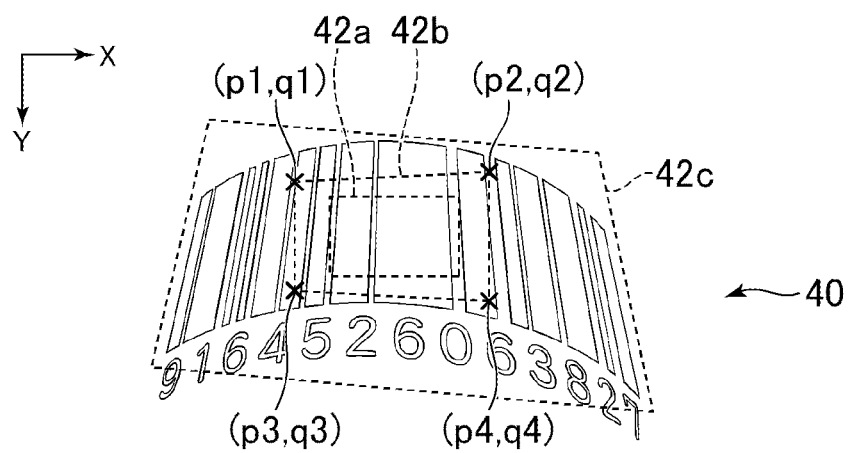
FIG. 4 A diagram schematically illustrating an example of a change in characteristic amount calculation reference region.

In this embodiment, the region identification section 22 executes, for each of a plurality of different XY coordinate systems (for example, XY coordinate systems obtained by rotating a reference XY coordinate system with a right direction of the bar code image 40 acquired by the image acquisition section 20 being a positive X-axis direction and a downward direction thereof being a positive Y-axis direction by 0° (that is, not rotating the XY coordinate system), 30°, 60°, 90°, 120°, and 150° in the counter-clockwise direction), processing of identifying a final characteristic amount calculation reference region 42c (see FIG. 4). Then, the region identification section 22 identifies, from among the plurality of final characteristic amount calculation reference regions 42c, one final characteristic amount calculation reference region, which is selected by a method to be described below, as the graphic code region.

Next, referring to FIG. 4 schematically illustrating an example of a change in characteristic amount calculation reference region 42, the processing of identifying the final characteristic amount calculation reference region 42c is described. Note that, in FIG. 4, the bar code image 40 is represented as an open white graphic. Further, FIG. 4 illustrates a case where a right direction of the bar code image 40 is the positive X-axis direction as an example. As illustrated in FIG. 4, the region identification section 22 first sets the characteristic amount calculation reference region 42 in an initial state (hereinafter, referred to as initially-set characteristic amount calculation reference region 42a) in the XY coordinate system. In this embodiment, the initially-set characteristic amount calculation reference region 42a has a predetermined shape, size, and position in the bar code image 40.

Then, the region identification section 22 executes processing of updating the characteristic amount calculation reference region 42 until a given condition is satisfied. Details of the processing of updating the characteristic amount calculation reference region 42 are described below. Then, the region identification section 22 identifies the characteristic amount calculation reference region 42 at a time when the predetermined condition is satisfied, as the final characteristic amount calculation reference region 42c.

In this embodiment, an outline graphic of the characteristic amount calculation reference region 42 is a quadrangle. By updating positions of four vertices of the outline graphic of the characteristic amount calculation reference region 42, the position, shape, and size of the characteristic amount calculation reference region 42 are updated.

FIG. 4 illustrates the characteristic amount calculation reference region 42 in the course of identifying the final characteristic amount calculation reference region 42c, as an intermediate state characteristic amount calculation reference region 42b. Next, the processing of updating the characteristic amount calculation reference region 42, which is executed on the intermediate state characteristic amount calculation reference region 42b, is described.

In the example of FIG. 4, pixel coordinate values of the upper left, upper right, lower left, and lower right vertices of the outline graphic of the intermediate state characteristic amount calculation reference region 42b are (p1, q1), (p2, q2), (p3, q3), and (p4, q4), respectively. In this embodiment, the relationships: p1=p3<p2=p4 and q2<q1<q3<q4 are satisfied.

In this embodiment, the total characteristic amount difference identification section 24 determines a plurality of characteristic amount calculation regions based on the characteristic amount calculation reference region 42. Specifically, the total characteristic amount difference identification section 24 determines for each vertex, for example, any one of nine pixels including a reference pixel, which is the vertex of the outline graphic of the characteristic amount calculation reference region 42 itself, a pixel to the upper left of the reference pixel, a pixel above the reference pixel, a pixel to the upper right of the reference pixel, a pixel to the left of the reference pixel, a pixel to the right of the reference pixel, a pixel to the lower left of the reference pixel, a pixel below the reference pixel, and a pixel to the lower right of the reference pixel, as the vertex of the outline graphic of the characteristic amount calculation region. For example, for the upper left vertex of the characteristic amount calculation reference region 42, nine pixels having the pixel coordinate values of (p1−1, q1−1), (p1, q1−1), (p1+1, q1−1), (p1−1, q1), (p1, q1), (p1+1, q1), (p1−1, q1+1), (p1, q1+1), and (p1+1, q1+1), respectively, are selected as vertices of the outline graphic of the characteristic amount calculation region. In this manner, in this embodiment, for each of the four vertices, any one of the nine pixels is determined, and hence 9×9×9×9=6561 characteristic amount calculation regions are determined.

Then, a total characteristic amount difference value CTotalDiff, which is a total value of differences between characteristic amounts (in this embodiment, luminance differences) of pixels that are adjacent along each of two directions that are orthogonal (or substantially orthogonal) to each other in the characteristic amount calculation region (in this embodiment, X-axis direction and Y-axis direction), is calculated for each of the characteristic amount calculation regions.

In the following description, pixels in the characteristic amount calculation regions having a Y component of the pixel coordinate values of a value y have X component pixel coordinate values of xmin, xmin+1, ..., xmax, and pixels in the characteristic amount calculation regions having an X component pixel coordinate value of x have Y component pixel coordinate values of ymin, ymin+1, ..., ymax. Further, in the following description, the characteristic amount (in this embodiment, luminance) at the pixel coordinate values $(x, y)$ is expressed as $C(x, y)$. Further, in the following description, the minimum value of the X component pixel coordinate values of the four vertices of the characteristic amount calculation region is pmin, and the maximum value thereof is pmax. Further, the minimum value of the Y component pixel coordinate values of the four vertices of the characteristic amount calculation region is qmin, and the maximum value thereof is qmax.

First, the total characteristic amount difference identification section 24 calculates, for each of y=qmin, qmin+1, ..., qmax, a subtotal X-axis characteristic amount difference value $CSubtotalDiff(x)=|C(xmin+1, y)-C(xmin, y)|+|C(xmin+2, y)-C(xmin+1, y)|+ \ldots +|C(xmax, y)-C(xmax-1, y)|$. (Note that, $|C(xmin+1, y)-C(xmin, y)|$ expresses the absolute value of the difference between the characteristic amount at the pixel coordinate values (xmin+1, y) and the characteristic amount at the pixel coordinate values (xmin, y); the same applies to the following terms.) Then, the total characteristic amount difference identification section 24 calculates a total X-axis characteristic amount difference value CTotalDiff(x) by summing the subtotal X-axis characteristic amount difference values CSubtotalDiff(x) calculated for y=qmin, qmin+1, ..., qmax.

Then, the total characteristic amount difference identification section 24 calculates, for each of x=pmin, pmin+1, ..., pmax, a subtotal Y-axis characteristic amount difference value $CSubtotalDiff(y)=|C(x, ymin+1)-C(x, ymin)|+|C(x, ymin+2)-C(x, ymin+1)|+ \ldots +|C(x, ymax)-C(x, ymax-1)|$. Then, the total characteristic amount difference identification section 24 calculates a total Y-axis characteristic amount difference value CTotalDiff(y) by summing the subtotal Y-axis characteristic amount difference values CSubtotalDiff(y) calculated for x=pmin, pmin+1, ..., pmax.

Then, the total characteristic amount difference identification section 24 identifies the absolute value of the difference between the total X-axis characteristic amount difference value CTotalDiff(x) and the total Y-axis characteristic amount difference value CTotalDiff(y) as the total characteristic amount difference value CTotalDiff of the characteristic amount calculation region.

Then, under the condition that the predetermined condition (that the total characteristic amount difference value CTotalDiff is the same for all the characteristic amount calculation regions, for example) is not satisfied, the region identification section 22 updates the positions of the four vertices of the outline graphic of the characteristic amount calculation reference region 42 to the positions of the four vertices of the outline graphic of the characteristic amount calculation region having the maximum total characteristic amount difference value CTotalDiff.

As described above, the characteristic amount calculation reference region 42 is updated.

Then, the region identification section 22 identifies the characteristic amount calculation reference region 42 under the condition that the predetermined condition (that the total characteristic amount difference value CTotalDiff is the same for all the characteristic amount calculation regions, for example) is satisfied, as the final characteristic amount calculation reference region 42c. Note that, the thus-identified final characteristic amount calculation reference region 42c is considered as a region having the local maximum total characteristic amount difference value CTotalDiff.

Then, in this embodiment, the region identification section 22 executes the identification of the final characteristic amount calculation reference region 42c for each of the plurality of XY coordinate systems as described above. Then, the region identification section 22 identifies the final characteristic amount calculation reference region 42c having the maximum total characteristic amount difference value CTotalDiff corresponding to the final characteristic amount calculation reference region 42c, as the graphic code region. The thus-identified graphic code region is considered as substantially circumscribing the graphic code 40a.

The deformation rule identification section 26 identifies a deformation rule for deforming the outline graphic of the graphic code region, which is identified by the region identification section 22, to a graphic of a known type. In this embodiment, for example, the deformation rule identification section 26 identifies a transformation matrix for transforming the quadrangle, which is the outline graphic of the graphic code region, to a rectangle of a known aspect ratio.

Figure 5:
FIG. 5 A diagram illustrating an example of the bar code image after deformation.

The deformation processing execution section 28 executes, on the entire bar code image 40, a deformation based on the deformation rule identified by the deformation rule identification section 26 (for example, linear transformation or affine transformation with the transformation matrix). FIG. 5 illustrates an example of the bar code image 40 after the deformation by the deformation processing execution section 28.

The character recognition section 30 executes OCR processing on the character string 40b positioned in a region having the given positional relationship with the graphic code 40a in the bar code image 40 after the deformation by the deformation processing execution section 28 (for example, region above or below the graphic code 40a when the graphic code 40a is positioned horizontally), to thereby perform character recognition on the character string 40b.

Figure 6:
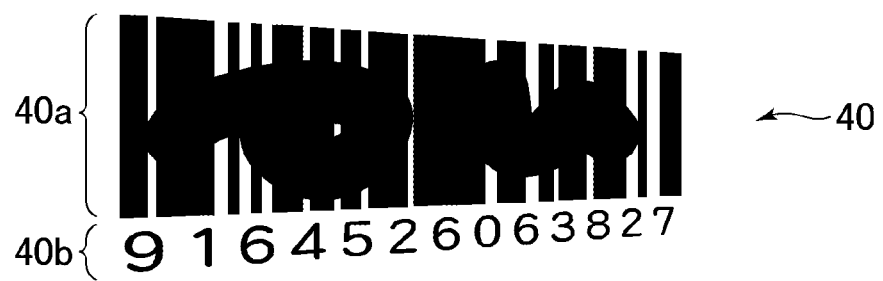
FIG. 6 A diagram illustrating another example of the bar code image.

In this manner, in this embodiment, the OCR processing is executed on the deformed character string 40b, and hence a character recognition accuracy is improved. For example, even under the condition that an entirety or a part of the bar code image 40 is blurred and information represented by the graphic code 40a of the bar code image 40 cannot be decoded, a result of the character recognition by the character recognition section 30 is treated as a decoding result of the information represented by the graphic code 40a, to thereby reduce the possibility that various types of information processing that use the decoding result of the information represented by the graphic code 40a (for example, processing of displaying detailed information on a product, which is associated with an ID represented by the character string 40b as the result of the character recognition, on the UI unit 16 such as a display) cannot be executed. In addition, the present invention can be applied as long as the entirety or a part of the bar code image 40 is difficult to identify and the part that is difficult to identify is deformed, irrespective of the reason why the part is difficult to identify. For example, even in a situation where, as illustrated in FIG. 6, the bar code image 40 is not blurred but a part of the bar code image 40 is soiled, the present invention can be applied.

Note that, the present invention is not limited to the above-mentioned embodiment.

For example, under the condition that the total characteristic amount difference value CTotalDiff of the final characteristic amount calculation reference region 42c is equal to or less than a predetermined reference value, the region identification section may identify the final characteristic amount calculation reference region 42c again after the initially-set characteristic amount calculation reference region 42a is changed. Alternatively, for example, the region identification section 22 may identify a polygon (for example, quadrangle) circumscribing the graphic code 40a as the graphic code region. Further, for example, the deformation rule identification section 26 may identify the deformation rule for deforming the outline graphic of the graphic code region, which is identified by the region identification section 22, to a graphic of a known shape and size.

Further, for example, the image processing device 10 may include a direction identification section for calculating, for each of the plurality of XY coordinate systems obtained by rotating the reference XY coordinate system with the right direction of the bar code image 40 acquired by the image acquisition section 20 being the positive X-axis direction by 0°, 30°, 60°, 90°, 120°, and 150° in the counter-clockwise direction, a frequency characteristic amount of an X-axis direction histogram of the bar code image 40 and a frequency characteristic amount of an Y-axis direction histogram of the bar code image 40 to identify an X-axis direction and a Y-axis direction of the XY coordinate system in which a difference between the frequency characteristic amounts satisfies a given condition (for example, a difference between the frequency characteristic amounts is maximum). Then, the region identification section 22 may identify the final characteristic amount calculation reference region 42c, which is determined for the XY coordinate system constituted by the X-axis direction and Y-axis direction identified by the direction identification section, as the graphic code region.

Further, for example, the total characteristic amount difference identification section 24 may use, instead of the sum of the differences between the characteristic amounts of the adjacent pixels, a sum of differences between characteristic amounts of adjacent subimages (for example, subimages which are obtained by dividing the bar code image 40 and each include at least one pixel) as the total characteristic amount difference value CTotalDiff.

Further, the deformation based on the deformation rule is not limited to the linear transformation or the affine transformation. For example, a non-linear transformation may be executed on the bar code image 40 by using a known method of correcting a non-linear distortion (specifically, for example, non-linear local geometric correction or linear local geometric correction), to thereby improve the character recognition accuracy of the character string 40b.

Further, for example, the characteristic amount calculation reference region 42 or the graphic code region may be a polygon constituted of five or more vertices. Alternatively, a side included in the characteristic amount calculation reference region 42 or the graphic code region may include a curve. Further, the region identification section 22 may use a known local search method other than the above-mentioned method, for example, to identify the graphic code region having the maximum total characteristic amount difference value CTotalDiff. Further, the image processing device 10 may include a plurality of housings. Further, the bar code image 40 specifically illustrated in the drawings is exemplary, and the scope of application of the present invention is not limited to the bar code image 40 illustrated in the drawings.

The invention claimed is:

1. An image processing device, comprising:
    image acquisition means for acquiring an image including a graphic code and at least one character positioned outside the graphic code, which are in a given positional relationship;
    deformation rule identification means for identifying a deformation rule for deforming the graphic code, which is included in the image acquired by the image acquisition means, to a graphic of a known type; and
    deformation processing execution means for executing, on the at least one character included in the image acquired by the image acquisition means, deformation processing based on the deformation rule identified by the deformation rule identification means,
    wherein the at least one character included in the image represents information represented by the graphic code.

2. The image processing device according to claim 1, further comprising:
    total characteristic amount difference identification means for identifying, for each of two directions that are substantially orthogonal to each other in a region within the image acquired by the image acquisition means, a total characteristic amount difference of subimages that are adjacent to each other along the each of the two directions in the region; and
    region identification means for identifying a region within the image acquired by the image acquisition means, in which a difference of the total characteristic amount differences identified by the total characteristic amount difference identification means for the two directions satisfies a given condition relating to the difference of the total characteristic amount differences,
    wherein the deformation rule identification means identifies a deformation rule for deforming an outline graphic of the region, which is obtained as a result of the identification by the region identification means, to the graphic of the known type.

3. The image processing device according to claim 2, wherein the region identification means identifies a region within the image acquired by the image acquisition means, in which the difference of the total characteristic amount differences identified by the total characteristic amount difference identification means for the two directions is maximum.

4. The image processing device according to claim 3, wherein the total characteristic amount difference identification means identifies, for the each of the two directions that are substantially orthogonal to each other in the region within the image acquired by the image acquisition means, a total luminance difference of pixels that are adjacent to each other along the each of the two directions in the region.

5. The image processing device according to claim 3,
    wherein the region identification means executes the identification of the region for a plurality of sets of the two directions, and
    wherein the deformation rule identification means identifies a deformation rule for deforming an outline graphic of a region, of a plurality of the regions associated with different sets of the two directions obtained as the results of the identification by the region identification means, in which a difference of the total characteristic amount differences identified by the total characteristic amount difference identification means is maximum, to the graphic of the known type.

6. The image processing device according to claim 3, further comprising direction identification means for identifying two directions that are substantially orthogonal to each other, in which a difference between frequency characteristic amounts of histograms in the two directions satisfies a given condition relating to the difference between the frequency characteristic amounts for at least a part of the image acquired by the image acquisition means,
    wherein the total characteristic amount difference identification means identifies, for each of the two directions identified by the direction identification means, a total characteristic amount difference of subimages that are adjacent to each other along the each of the two directions.

7. The image processing device according to claim 3, wherein the deformation rule identification means identifies a deformation rule for deforming the graphic code, which is included in the image acquired by the image acquisition means, to a graphic of a known shape.

8. The image processing device according to claim 3, further comprising character recognition means for recognizing a character after the execution of the deformation processing by the deformation processing execution means.

9. The image processing device according to claim 2, wherein the total characteristic amount difference identification means identifies, for the each of the two directions that are substantially orthogonal to each other in the region within the image acquired by the image acquisition means, a total luminance difference of pixels that are adjacent to each other along the each of the two directions in the region.

10. The image processing device according to claim 2,
    wherein the region identification means executes the identification of the region for a plurality of sets of the two directions, and
    wherein the deformation rule identification means identifies a deformation rule for deforming an outline graphic of a region, of a plurality of the regions associated with different sets of the two directions obtained as the results of the identification by the region identification means, in which a difference of the total characteristic amount differences identified by the total characteristic amount difference identification means is maximum, to the graphic of the known type.

11. The image processing device according to claim 2, further comprising direction identification means for identifying two directions that are substantially orthogonal to each other, in which a difference between frequency characteristic amounts of histograms in the two directions satisfies a given condition relating to the difference between the frequency characteristic amounts for at least a part of the image acquired by the image acquisition means,
    wherein the total characteristic amount difference identification means identifies, for each of the two directions identified by the direction identification means, a total characteristic amount difference of subimages that are adjacent to each other along the each of the two directions.

12. The image processing device according to claim 2, wherein the deformation rule identification means identifies a deformation rule for deforming the graphic code, which is included in the image acquired by the image acquisition means, to a graphic of a known shape.

13. The image processing device according to claim 2, further comprising character recognition means for recognizing a character after the execution of the deformation processing by the deformation processing execution means.

14. The image processing device according to claim 1, wherein the deformation rule identification means identifies a deformation rule for deforming the graphic code, which is included in the image acquired by the image acquisition means, to a graphic of a known shape.

15. The image processing device according to claim 1, further comprising character recognition means for recognizing a character after the execution of the deformation processing by the deformation processing execution means.

16. The image processing device according to claim 1, wherein the deformation rule identification means identifies the deformation rule for deforming the graphic code based on only the graphic code.

17. The image processing device according to claim 16, wherein after the deformation rule is identified for deforming the graphic code, the deformation rule is executed on the entire image including both the graphic code and the at least one character.

18. The image processing device according to claim 1, wherein the deformation rule identification means identifies the deformation rule for deforming the graphic code independent of the at least one character.

19. An image processing method, comprising:
an image acquisition step of acquiring an image including a graphic code and at least one character positioned outside the graphic code, which are in a given positional relationship;
a deformation rule identification step of identifying a deformation rule for deforming the graphic code, which is included in the image acquired in the image acquisition step, to a graphic of a known type; and
a deformation processing execution step of executing, on the at least one character included in the image acquired in the image acquisition step, deformation processing based on the deformation rule identified in the deformation rule identification step,
wherein the at least one character included in the image represents information represented by the graphic code.

20. An image processing device, comprising:
a controller comprising a processor and a memory;
the controller configured to:
acquire an image including a graphic code and at least one character positioned outside the graphic code, which are in a given positional relationship;
identify a deformation rule for deforming the graphic code, which is included in the acquired image, to a graphic of a known type; and
execute, on the at least one character included in the acquired image, deformation processing based on the deformation rule,
wherein the at least one character included in the image represents information represented by the graphic code.

* * * * *